June 2, 1942.  G. D. SAILER ET AL  2,285,096
COMBINATION BEVERAGE DISPENSER AND ICE JAR
Filed March 14, 1941
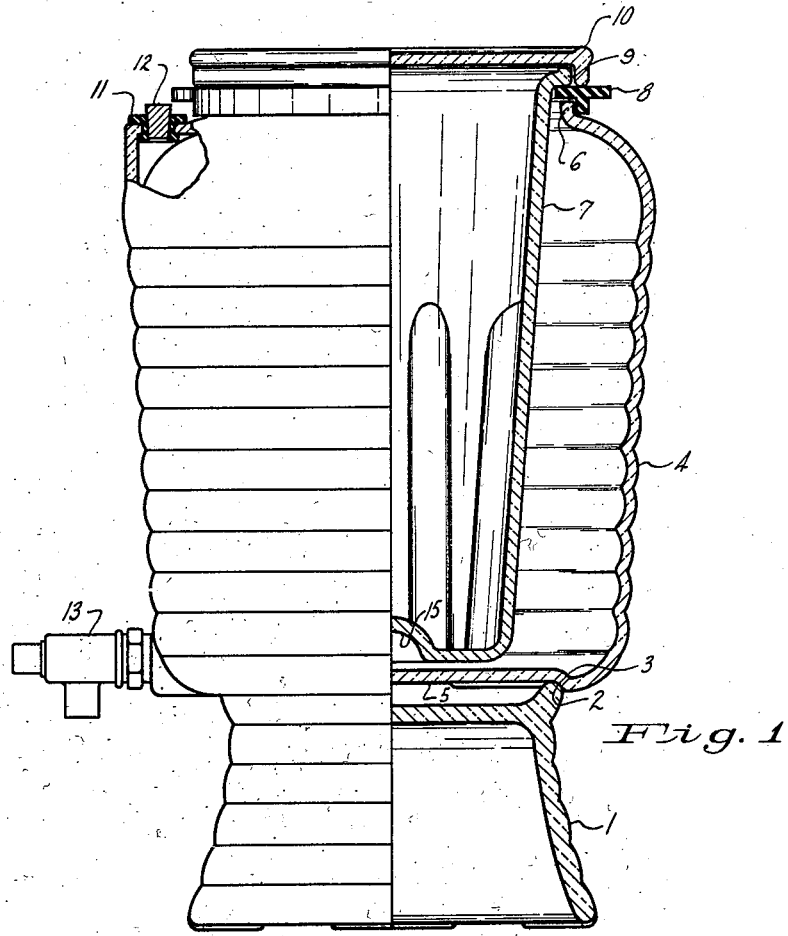
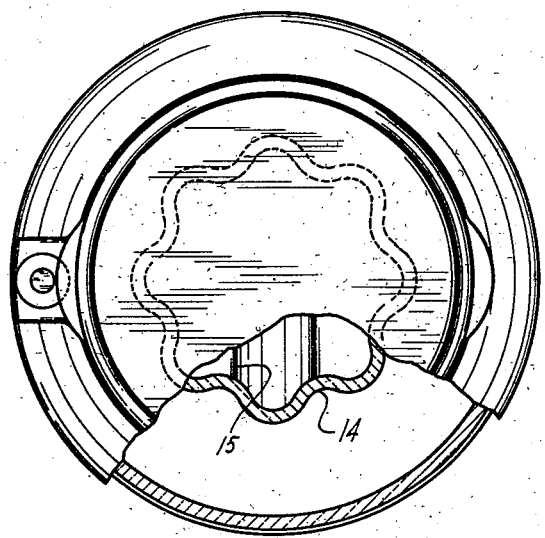
INVENTOR.
George D. Sailer
and Louis Poglein
BY William B. Jaspert
Attorney.

Patented June 2, 1942

2,285,096

UNITED STATES PATENT OFFICE 2,285,096

COMBINATION BEVERAGE DISPENSER AND ICE JAR

George D. Sailer and Louis Poglein, Jeannette, Pa., assignors to McKee Glass Company, Jeannette, Pa., a corporation of Pennsylvania Application March 14, 1941, Serial No. 383,306

1 Claim. (Cl. 62—149)

This invention relates to new and useful improvements in sanitary coolers for dispensing beverages, and it is among the objects thereof to provide a cooler of glass comprising in combination a beverage container and an ice jar in which the ice jar is disposed centrally of and inside the beverage container, and is adapted to act as a stirring element to prevent accumulation of solids in the region of the dispensing faucet.

The invention will become more apparent from a consideration of the accompanying drawing constituting a part hereof in which like reference characters designate like parts and in which:

Fig. 1 is a side elevational view partially in cross-section of a combination beverage container and ice jar embodying the principles of this invention; and Fig. 2 a top plan view thereof partially broken away.

In the drawing, the numeral 1 designates a base having a beaded flange 2 for engaging a shoulder 3 formed at the termination of the base and side walls of the beverage container 4, the base designated by the numeral 5 being recessed to form the shoulder 3.

The beverage container 4 has a corrugated sidewall, as has the base 1, to enhance the appearance of the cooler, and the upper portion of the beverage container 4 terminates in a wide-mouth neck 6 of a size to receive an ice jar 7. An annular sealing gasket of T-shaped cross-section interacts with the neck 6 and a shoulder 9 of the beverage container and ice jar, respectively, and the top of the gasket 8 is adapted to seat a cover 10, so that no bearing load or weight is directly imposed by contact with the glass on glass.

The beverage container is provided with a charging opening 11 which may be sealed-off by a closure 12 and the base of the beverage container is provided with a faucet 13 for dispensing the beverage therefrom.

Beverage containers of the type herein shown are employed at soda fountains to dispense beverages containing citrous fruit juices, and the solids of the fruit accumulate at the bottom of the beverage container and in the region of the dispensing faucet 13. The ice jar 7 is of corrugated or fluted shape, as shown by the numeral 14, Fig. 2, and with a bottom groove 15, Figs. 1 and 2. These flutes and grooves function as vanes for stirring the liquid in the beverage container when the ice jar is gripped at the flange 9 and subjected to oscillatory movement. The ice jar is designed to extend to substantially the base of the beverage container to engage the settled fruit particles or solids at the bottom of the container, thereby agitating the contents of the beverage container, to remove the solids from the region of the faucet when the ice jar is actuated.

The design of the ice jar is such as to effectively stir the contents of the beverage container without the need of projecting lugs that are frangible and readily broken, and by the proximity of the fluted base of the ice jar with the base of the beverage container the necessary stirring action is effectively accomplished.

Although one embodiment of the invention has been herein illustrated and described, it will be evident to those skilled in the art that various modifications may be made in the details of construction without departing from the principles herein set forth.

We claim:

In a beverage dispenser, a beverage container, an ice jar disposed in said container and extending to substantially the bottom thereof, said ice jar having a fluted wall extending from the bottom a substantial distance vertically thereof and having a transverse flute on the bottom to agitate the liquid in the beverage container when the ice jar is oscillated.

GEORGE D. SAILER.
LOUIS POGLEIN.